(Model.)
H. SCHWARZWALDER.
NUT LOCK.
No. 291,945. Patented Jan. 15, 1884.
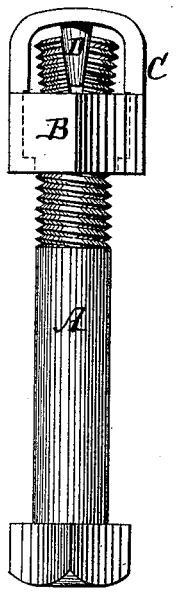
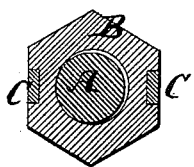
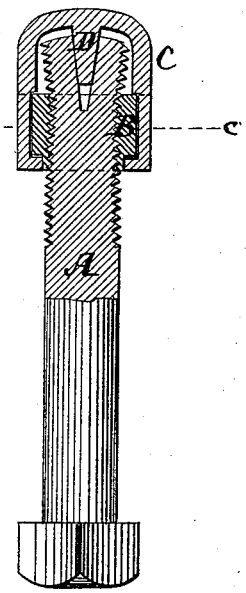
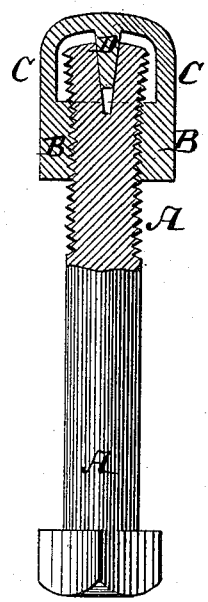
Witnesses
John C. Tunbridge
John M. Speer.
Inventor:
Henry Schwarzwalder
by his attorneys
Briesen & Steele

UNITED STATES PATENT OFFICE.

HENRY SCHWARZWALDER, OF NEW YORK, N. Y.

NUT-LOCK.

SPECIFICATION forming part of Letters Patent No. 291,945, dated January 15, 1884.

Application filed December 7, 1883. (Model.)

*To all whom it may concern:*

Be it known that I, HENRY SCHWARZWALDER, a resident of New York city, in the county and State of New York, have invented an Improved Nut-Lock, of which the following is a full, clear, and exact description, reference being made to the accompanying drawings, in which—

Figure 1 is a side view of my improved nut-lock. Fig. 2 is a central section of the same. Fig. 3 is a horizontal section on the line $c\ c$, Fig. 2. Fig. 4 is a central section of a modification of the same.

This invention relates to a new means for securing a nut on a bolt and preventing it from turning loose thereon.

The invention consists in connecting the nut directly by a yoke, cap, or frame with a wedge or conical pin, for spreading the slotted bolt whenever the nut is turned down upon said bolt.

In the drawings, A represents the bolt, which is slotted at its threaded end, the same as described in Letters Patent No. 288,263, of November 13, 1883.

B is the nut. To this nut is rigidly secured a yoke, frame, or cap, C, which extends over the slotted end of the bolt, as shown. To this yoke, frame, or cap is fastened a downwardly-projecting tapering pin, D, which is adapted to enter as a wedge into the slot of the bolt, so as to spread the bolt when the nut is screwed down. It will be seen that when the nut is turned the yoke and pin turn with it, and at the same time move down with it. The conical form of the pin D permits it to turn within the slotted bolt. When the nut is unscrewed, more force is required, as it will have to compress the bolt back into its normal form. The yoke being rigidly secured to the nut, allows the latter to be fairly grasped by a wrench in turning and unturning. The pin D may, if desired, be swiveled in the yoke C. In that case it need not revolve, and may be of pyramidal instead of conical form.

The manner of securing the yoke to the nut may be varied. It may be fastened, as in Figs. 2 and 3, by letting the ends of the yoke into grooves in the sides of the nut, and forming shoulders above and below for holding the yoke longitudinally; but other means for securing it may be devised.

If the yoke is made in form of a cap, it will protect the projecting end of the bolt from rain, dust, &c.

I claim—

1. The nut B, frame, yoke, or cap C, and the pin D, connected directly to each other, as specified, in combination with the slotted bolt A, substantially as herein shown and described.

2. The nut B, frame, yoke, or cap C, and conical pin D, all rigidly united together, in combination with the slotted bolt A, substantially as herein shown and described.

HENRY SCHWARZWALDER.

Witnesses:
 WILLY G. E. SCHULTZ,
 HARRY M. TURK.